April 15, 1952   J. W. BARNES   2,592,643
GYROSOPE
Filed Nov. 2, 1945   4 Sheets-Sheet 3

JEFFERY WALTON BARNES,
Inventor

BY Robert B Pearson
Attorney

April 15, 1952  J. W. BARNES  2,592,643
GYROSOPE
Filed Nov. 2, 1945  4 Sheets-Sheet 4

JEFFERY WALTON BARNES
Inventor

By Robert B. Larson
Attorney

Patented Apr. 15, 1952

2,592,643

UNITED STATES PATENT OFFICE 2,592,643

GYROSCOPE

Jeffery Walton Barnes, Farnborough, England

Application November 2, 1945, Serial No. 626,362
In Great Britain May 16, 1942

11 Claims. (Cl. 74—5.34)

The invention relates to gyroscopic systems of the kind comprising a gyroscope mounted to have three degrees of freedom with respect to its support, such as may be employed to define a plane with reference to the earth's axis, e. g. for stabilising a member or for controlling an indicating member in navigational systems for aircraft or other craft which are subject to pitch and roll, and also comprising an erecting system for the said gyroscope which may be termed a free gyroscope.

In gyroscopic systems of such kind pendulous masses are ordinarily employed in the erecting system to bring the free gyroscope initially to its pre-determined position in relation to a vertical datum, or to restore it to its position if it has been disturbed. The acceleration accompanying a turn of the craft carrying the free gyroscope, however, causes disturbance of any pendulous mass free to move in a direction transverse to the course of the craft, i. e. indicating roll, so that it no longer accurately defines the vertical.

In accordance with the invention, a gyroscopic system comprises a free gyroscope as hereinbefore defined, and an erecting system therefor having a pendulous mass defining a vertical datum and associated with a second gyroscope to counteract the effect of centrifugal force upon said pendulous mass. When the free gyroscope forms part of a navigational system for craft liable to pitching and rolling motion, e. g. an aircraft bombsight or automatic pilot, the erecting system has one pendulous mass to define the vertical during pitching movement, a second pendulous mass to define the vertical during rolling movement and a second gyroscope associated with said second pendulous mass to counteract the disturbing effect thereon of centrifugal force when the craft is turning.

The pendulous mass and second gyroscope may be combined as a single unit, or the pendulous mass and second gyroscope may be separate and associated through a mechanical linkage or pneumatic or other servo system.

An erecting system in which the second gyroscope and pendulum are directly connected will function properly during correctly banked turns of aircraft having such a system, but this depends upon the rate of change in the azimuth heading of the craft (this being the factor affecting the pendulum). Thus for the system to function correctly the angle between the azimuth heading of the craft and the azimuth component of the tangent to the path of the craft (angle of sideslip), must be constant. Disturbances involving change of angle of sideslip are in general short period disturbances and to provide for such conditions the second gyroscope and pendulum may be connected through a lagging system so that the instantaneous effect of a change of angle of sideslip on the second gyroscope is not transmitted at once to the pendulum.

The erecting system may, however, be modified by providing instead of two pendulous masses, their equivalent in the form of a single member rolling on a plane and means for transmitting movement of the rolling member in the direction of movement of the craft representing pitch to the free gyroscope and in a direction transverse thereto representing roll, a second gyroscope being associated with the latter movement transmitting means. The movement of the rolling member may be transmitted, for example, through forks.

The invention is illustrated by way of example only in the accompanying drawings in which:

Fig. 1 is an elevational view partly in section looking in the direction of travel, and Fig. 2 is a plan view of Fig. 1.

Figure 1:
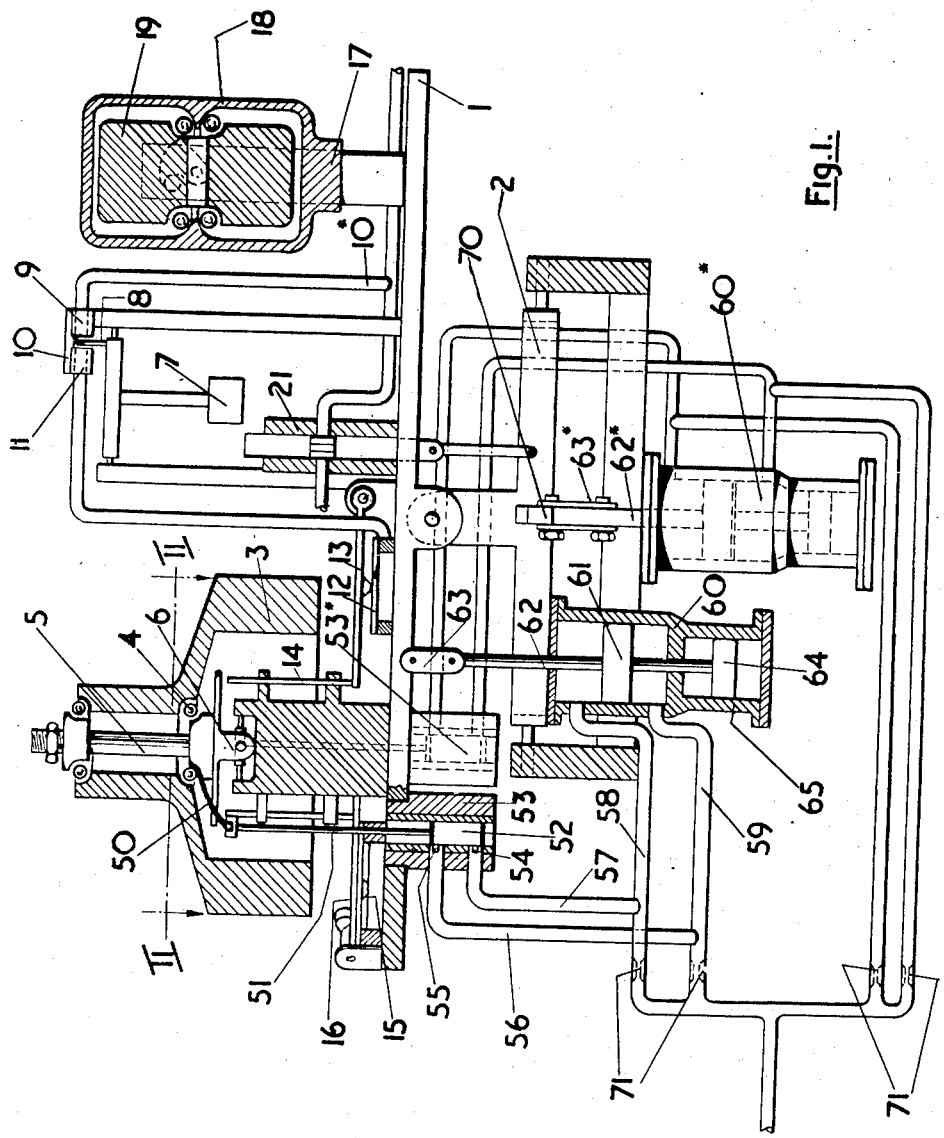
Figures 1 and 2 illustrate an apparatus according to the invention in which pneumatic means for applying erecting torques to the free gyroscope are controlled by two pendulums, one of which actually carries a second or compensating gyroscope.
Figure 2:
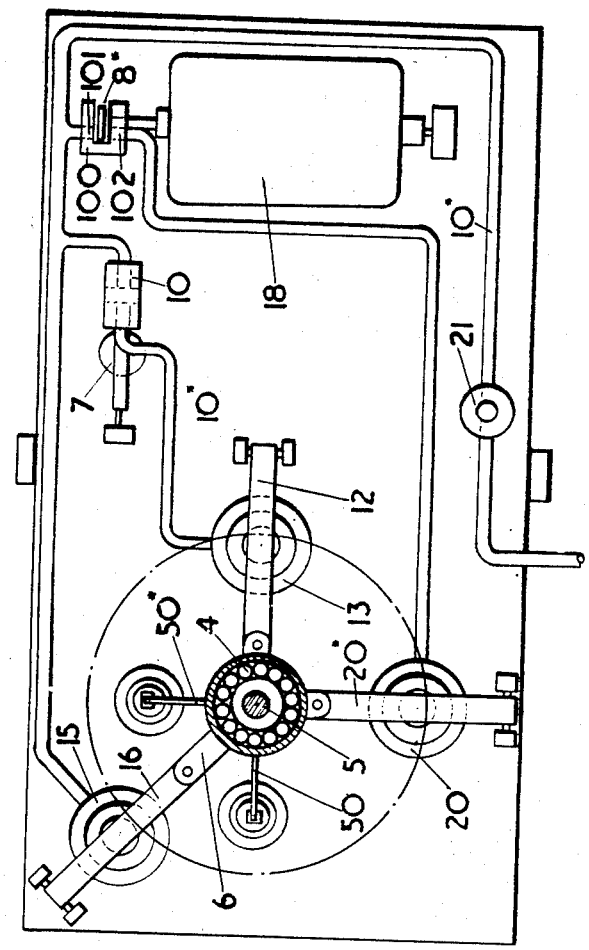
Figure 3:
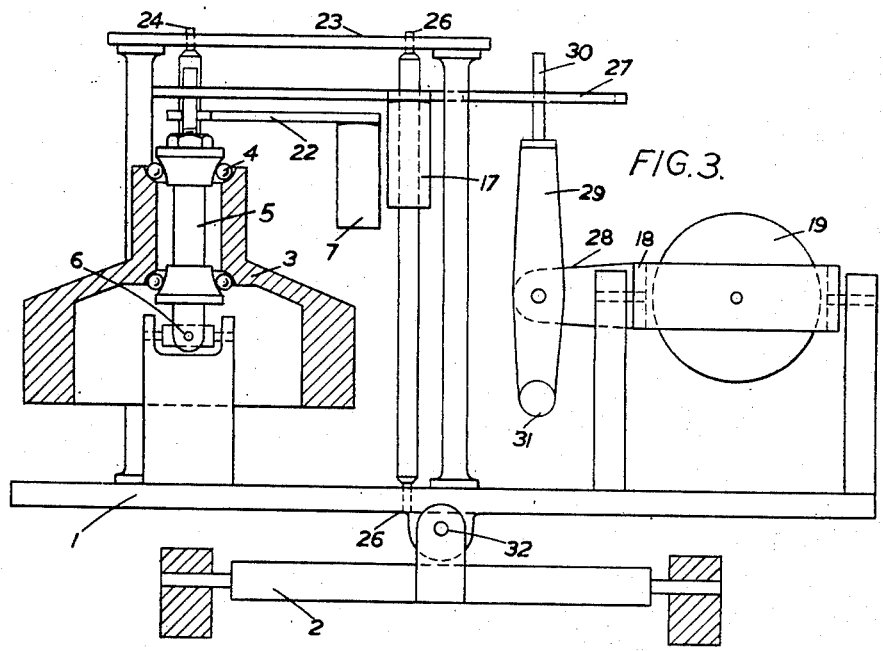
Figures 3 and 4 illustrate another apparatus according to the invention in which means responsive to pitch and roll, respectively, are connected by bell crank levers to apply erecting torques to the gyroscope, and in which the roll mass is connected by a variable ratio lever arrangement to a second or compensating gyroscope. These views are taken in a manner similar to Figs. 1 and 2.
Figure 4:
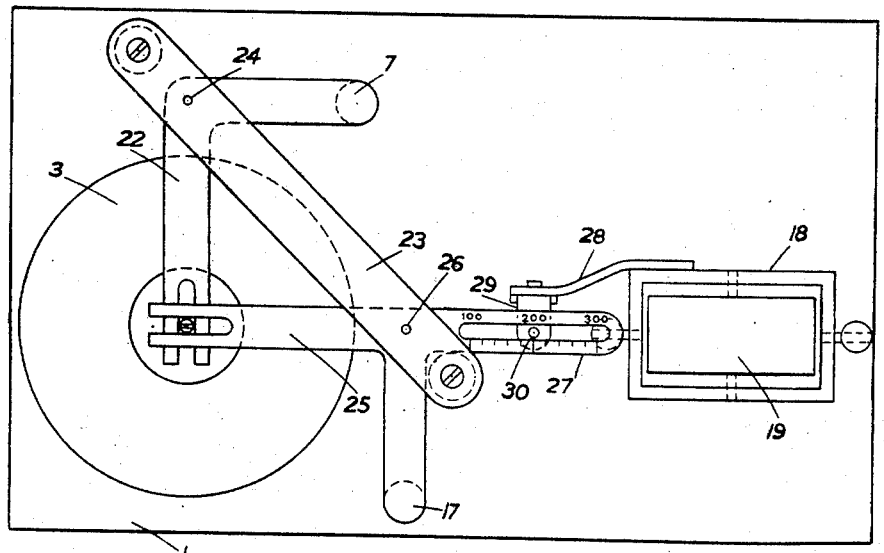
Figure 6:
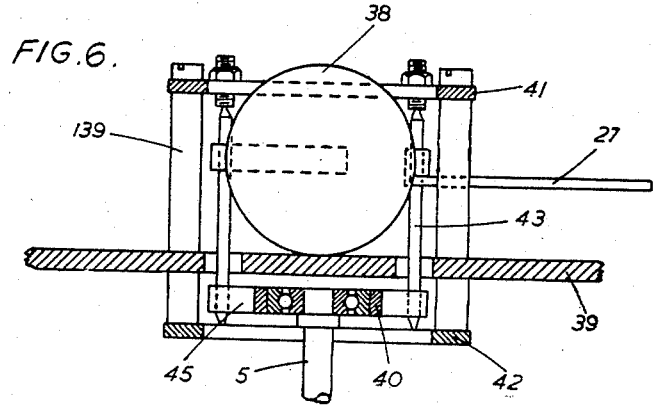
Figure 7:
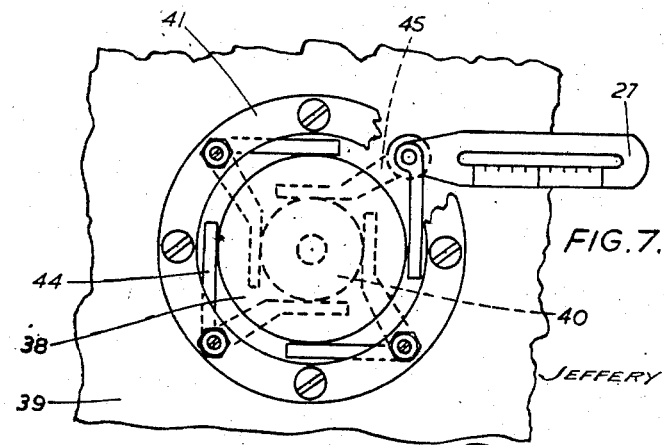

Figures 6 and 7 are taken in the manners of Figs. 1 and 2, and illustrate a third apparatus according to the invention in which a single mass responsive to both pitch and roll is connected by a lever arrangement to apply erecting torques to the gyroscope and is also connected, so far as roll movement is concerned, by a variable ratio lever with a second or compensating gyroscope like that of the apparatus shown in Figures 3 and 4.

In the drawings corresponding parts are indicated by the same reference numerals throughout.

Referring to Figs. 1 and 2, the numeral 1 indicates a platform to be stabilised to the horizontal. The platform is mounted in an aircraft on a universal joint generally indicated at 2 so as to be capable of rocking in any direction. 3 is the rotor of the free gyroscope carried in ball bearings 4 on a vertical spindle 5 which is mounted on the platform 1 by a universal joint 6.

The free gyroscope 3 may control the platform by any known servo means, one of which is illustrated by way of example. As illustrated the servo means comprises an arm 50 on the spindle 5 connected by the rod 51 to a valve 52 slidable in a cylinder 53 having ports 54, 55 communicating with by-pass pipes 56, 57 connected to pipes 58, 59 for supplying compressed air to a servo motor 60. The servo-motor cylinder 60 contains a piston 61 connected by a piston rod 62 and link 63 to the platform 1. The piston 61 is connected to a piston 64 in a cylinder 65 containing fluid to act as a dashpot. Pipe lines 58, 59 from a supply (not shown) communicate with ports in the cylinder 60 above and below the piston 61 and the arrangement is such that when the valve 52 is moved by the gyroscope to uncover one port say 54, the compressed air in this pipe will escape and hence the pressure in the pipe 58 communicating with the upper side of the piston 61 will be reduced relative to that on the underside of the piston 61. The piston will rise and through the piston rod 62 and link 63 the platform will be tilted in a clockwise direction carrying the valve cylinder 53 with it until the piston 52 again closes port 54, when the servo-motor will be stopped. If the piston 52 is moved to uncover the port 55, the system will act in a similar way but the piston will in this case be lowered and the platform will be tilted in an anti-clockwise direction. The servo mechanism described will enable the platform to be controlled from the gyroscope in one plane, namely that of the drawing in Fig. 1 and this mechanism is duplicated to control the platform from the gyroscope in a plane at right angles by arranging the parts of this duplicate mechanism so that the arm 50* is at right angles to the arm 50, and that the piston rod 62* is connected by a link 63* to a lug 70 on the joint 2 at a point spaced apart from its bearings. The valve cylinder of this duplicate mechanism is indicated at 53* and the servo-motor at 60*. In order to prevent inter-action, constrictions 71 are provided in the pipe lines at the inflow side of the by-pass pipes. The gyroscope can be driven at high speed by air in the well known way.

A pendulum 7 supported on the platform 1 and sensitive to pitching of the aircraft has attached a small vane 8 which moves in a slot in a block 10 and partly interrupts the supply of compressed air through the pipe 10* passing from a jet 9 to a pick-up hole 11, whence it is conveyed to a flexible diaphragm 12 to which a lever 13 and push rod 14 are attached so that movement of the diaphragm 12 applies an erecting torque to the free gyroscope about the roll axis to precess it and therefore the platform 1 about the pitch axis.

A pendulous weight 17 is carried by a casing 18 containing a second gyroscope rotor 19 driven by air jets (not shown). The casing 18 is pivotally mounted on fore-and-aft horizontal pivots on the platform 1 and carries a vane 8* (Fig. 2) similar to the vane 8 (Fig. 1). Vane 8* interrupts the compressed air passing from a jet 101 to a pick-up hole 102 in a block 100 similar to the block 10 and the collected pressure from which is directed to a diaphragm 20 which applies torque to the vertical spindle 5 about the pitch axis through a lever 20 and a push rod similar to the lever 13 and push rod 14, to precess the free gyroscope and, therefore, the platform 1 about the roll axis. The air supply to the jets 9 and 101 is applied also directly to a third diaphragm 15 connected, via a lever 16 and push rod similar to the lever 13 and push rod 14, to apply to the free gyroscope torque about an axis at 45 degrees to the roll and pitch axes and, therefore, torque components about said roll and pitch axes in opposition to the torques about said roll and pitch axes applied to the free gyroscope by the diaphragms 12 and 20. It will be seen that the vanes 8 and 8* will have positions for which the variable torque applied by diaphragms 12 and 20 will be exactly balanced by the roll and pitch components of the torque applied by diaphragm 16, and that when either vane moves this balance will be disturbed and precessing torque of corresponding sense and magnitude will be applied to the free gyroscope. The pendulum 17 will remain vertical during turns if the speed of rotation of the gyroscope rotor 19 is adjusted to suit the speed of the aircraft and the speed of rotation of the rotor 19 may be controlled by varying the pressure of the driving air jets. To prevent the results of serious speed errors being communicated to the free gyroscope during steeply banked turns of the aircraft a piston valve 21 is provided in the pipe 10*, the piston valve being connected to the gimbal 2. This valve will cut off the supply to the three-diaphragms when the bank exceeds a pre-determined minimum, say about 10 degrees.

Referring now to Figs 3 and 4, the free gyroscope spindle 5 is embraced by a fork formed in a bell crank lever 22. This lever is pivoted at 24 between a frame 23 and the platform 1 and carries on its other limb a pendulous mass 7 sensitive to pitch. A change in pitch attitude of the platform carrying the gyroscopic system will consequently cause a force along the roll axis to be transmitted from the fork on the bell crank lever 22 to the spindle 5, and will hence cause the free gyroscope to precess about the pitch axis. The spindle 5 is also embraced by a fork at the end of a bell crank lever 25 pivoted at 26 between the frame 23 and platform 1 and carrying a pendulous mass 17, sensitive to roll and a slotted arm 27. Thus a change in roll attitude will cause a force along the pitch axis to be transmitted to the spindle 5 by the fork at the end of the lever 25, and will thus cause the free gyroscope to precess about the roll axis. The pendulous masses 7 and 17 may, if desired, be mounted on anti-vibration mountings. The turn-correcting or second gyroscope 19 is mounted in a gimbal ring 18 pivotally mounted on a pillar fixed to the platform 1.

A bracket 28 projecting from the gimbal 18 carries a vertical arm 29 terminating at its upper end in a short spindle 30 engaging the slotted arm 27 and at its lower end in a balance weight 31. During turns the second gyroscope 19 will therefore exert on the slotted arm 27, through the bracket 28, arm 29 and spindle 30, a force acting in opposition to force arising from the apparent roll indicated by the mass 17 and due to centrifugal force acting thereupon. The arm 29 may be rotated e. g. manually so as to move the spindle 30 along the slot of the arm 27 so that the control of the gyroscope 19 on the pendulous mass 17 may be varied to suit various air speeds of the aircraft without varying the speed at which the gyroscope rotor 19 is driven. For this purpose the slot in the arm 27 may be graduated in airspeed.

Provision (not shown in the drawings) may be made for automatically uncoupling the pendulous masses from the vertical gyroscope during steeply banked turns, e. g. by hinging the forks upwards so as to disengage the spindle 5 when a selected maximum bank angle is attained or by opening the forks, limit stops for the bell crank lever being provided to prevent the open prongs of the forks touching the spindle 5. Either of the foregoing methods may be put automatically into operation by direct mechanical linkage from a cam mechanism on the roll axis 32 of the platform 1.

Figure 5:
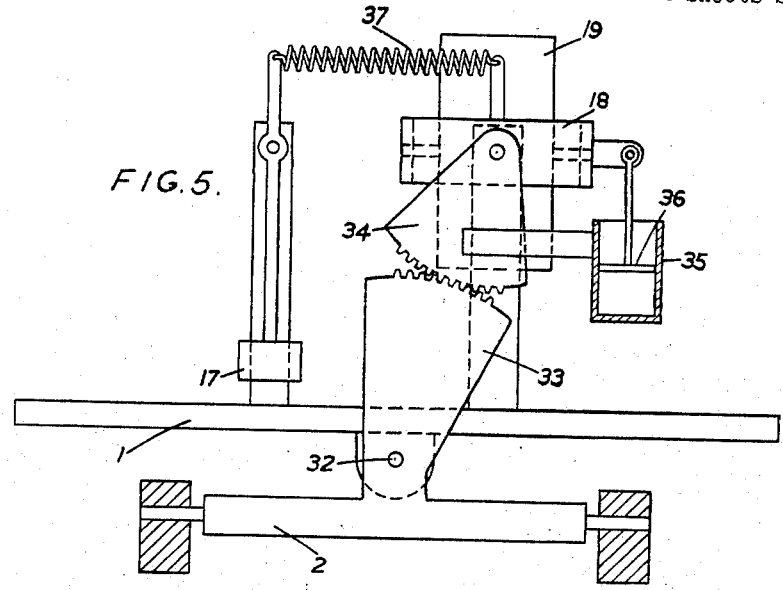
Figure 5 is elevational view partly in section looking in the direction of travel, and is illustrative of a detail applicable to cases like that of Figures 1 and 2, or, with some modification as set forth herein, to cases like that of Figures 3 and 4, for damping the action of the second or compensating gyroscope.

In the arrangement shown in Fig. 5, it is to be assumed that the roll pendulum 17 controls a vertical free gyroscope also mounted on and controlling a platform 1 in a manner similar to that shown in Figs. 1 and 2. Mounted on the support 2 is toothed sector 33 engaging a second toothed sector 34 (referred to in the claims as an abutment) which is pivoted concentrically with the gimbal 18 of the turn-correcting or second gyroscope 19, but free to move independently thereof. The gimbal 18 carries a piston 36 pivotally secured thereto which moves in a dashpot 35 which is fast with the sector 34. The gimbal 18 is also connected to the roll pendulum 17 by a spring 37. For flight involving change of sideslip without banking the sector 34 with which the dashpot 35 is fast will be held stationary by the sector 33 so that any tendency of the gyroscope 19 to undergo precessional movement is resisted by the dashpot, and consequently a lag is introduced in the action of the gyroscope 19 on the pendulum 17. For a correctly banked turn not involving sideslip, the sector 34 and the gimbal 18 move together and hence no damping is introduced.

To enable the erecting system illustrated in Fig. 5 to be utilised for controlling a vertical gyroscope in a manner similar to that shown in Fig. 3 and 4, the axis of the roll pendulum 17 would have to be arranged normal to instead of parallel to the platform. By omitting the sectors 33 and 34 from the arrangement shown in Fig. 5 and mounting the dashpot 35 on the platform 1, an arrangement would be produced in which the turn-correcting gyroscope 19 and roll pendulum 17 are still connected through a lagging system during correctly banked turns and thus the correcting influence of the gyroscope on the roll pendulum 17 would always be applied sluggishly. In certain practical applications, however, such lag may not be serious.

Referring to Figs. 6 and 7, a spherical mass 38 is mounted to roll on a plate 39 which is rigidly attached to and parallel with the platform to be stabilised. The free gyroscope spindle 5 is mounted in a ball bearing 40. Rings 41, 42 are supported by pillars 139 from the plate 39, and between them are pivoted four spindles 43 each carrying an arm 44 which can contact the sphere 38 and a second arm 45 which can contact the ball bearing 40. It will be clear that any force exerted by the sphere 38 parallel to the plate 39 will be transferred to the gyro spindle 5 in a direction at right angles to the line of application of the force by the sphere. One of the spindles 43 carries a slotted arm 27 whose function is similar to that of the arm 27 in Figs. 3 and 4.

I claim:

1. Gyroscope apparatus for defining the vertical in a moving craft comprising a free gyroscope, a servo system, a member stabilised by said free gyroscope and servo system, gravity controlled erecting means for the free gyroscope, a second gyroscope mounted to receive precessing torque from the craft during turning movement of the craft, and means controlled by said second gyroscope for applying compensating force to said erecting means in opposition to the disturbing centrifugal force which acts on said erecting means during turning movement of the craft.

2. Gyroscopic apparatus for defining the vertical in a moving craft comprising a free gyroscope, a servo system, a member stabilised by said free gyroscope and servo system, erecting means for the free gyroscope under the control of at least one mass mounted on the stabilised member to tend to move relatively thereto when tilting movement of said member occurs, a second gyroscope mounted to receive precessing torque from the craft during turning movement of the latter, and means controlled by said second gyroscope for applying compensating force to said erecting means in opposition to the disturbing centrifugal force which acts on said erecting means during turning movement of the craft.

3. Gyroscopic apparatus for defining the vertical in a moving craft comprising a free gyroscope, a servo system, a member stabilised by said free gyroscope and servo system and mounted to turn with the craft, means mounting the free gyroscope on said stabilised member, a pitch mass mounted pivotally on the stabilised member to tend to move about its pivot under the influence of gravity when pitch movement of the stabilised member occurs, and which is connected to the free gyroscope, whereby said pitch mass applies torque to the free gyroscope to precess it in pitch, a roll mass mounted pivotally on the stabilised member to tend to move about its pivot under the influence of gravity when roll movement of the stabilised member occurs, and which is also connected to the free gyroscope, whereby said roll mass applies torque to the free gyroscope to precess it in roll, a second gyroscope mounted on the stabilised member to receive precessing torque from the craft during turning movement of the latter, and a connection from said second gyroscope to the roll mass whereby compensating forces is applied to said roll mass in opposition to the disturbing centrifugal force which acts thereon during turning movement of the craft.

4. Gyroscopic apparatus for defining the vertical in a moving craft, as claimed in claim 3, wherein the connection of the second gyroscope to the roll mass takes the form of bearings for the rotor of the second gyroscope which are secured rigidly to the roll mass with the rotor axis extending transversely of the yaw axis and of the axis of pivot of the roll mass.

5. Gyroscopic apparatus for defining the vertical in a moving craft, as claimed in claim 1, wherein the connection from the second gyroscope to the erecting means is of the variable ratio type.

6. Gyroscopic apparatus for defining the vertical in a moving craft, as claimed in claim 3, wherein the connection from the second gyroscope to the roll mass includes a variable ratio lever.

7. Gyroscopic apparatus for defining the vertical in a moving craft comprising a free gyroscope, a servo system, a member stabilised by said free gyroscope and servo system, gravity operated erecting means for the free gyroscope, a second gyroscope mounted to receive precessing torque from the craft during turning movement of the craft, resilient means connecting the second gyroscope and the gravity operated erecting means to apply compensating force to said erecting means in opposition to the disturbing centrifugal force which acts on said erecting means during turning movement of the craft, an abutment, and damping means connected between the second gyroscope and said abutment to damp the response of the second gyroscope to precessing torque received thereby during turning movement of the craft.

8. Gyroscopic apparatus for defining the vertical in a moving craft as claimed in claim 7, and means for imparting motion to the abutment from the craft during rolling movement of the latter to reduce the damping action during banked turning movement of the craft.

9. Gyroscopic apparatus for defining the vertical in a moving craft comprising a free gyroscope, a servo system, a member stabilised by said free gyroscope and servo system and mounted to turn with the craft, means mounting the free gyroscope on said stabilised member, a pitch and roll mass mounted on the stabilised member to move in any direction paralled with a plane which is horizontal when the stabilised member is in its correct stabilised position, means connecting said pitch and roll mass to the free gyroscope to apply torque to the latter to precess it in pitch when the stabilised member moves in pitch and to precess it in roll when said member moves in roll, a second gyroscope mounted on the stabilised member to receive precessing torque therefrom during turning movement of the craft, and means connecting the second gyroscope to said pitch and roll mass to apply compensating force to said mass in opposition to the disturbing centrifugal force which acts thereon during turning movement of the craft.

10. Gyroscopic apparatus for defining the vertical in a moving craft comprising a free gyroscope, a servo system, a member stabilised by said free gyroscope and servo system and mounted to turn with the craft, means mounting the free gyroscope on said stabilised member, means for erecting the free gyroscope in pitch including a pitch bell crank lever fulcrummed on the stabilised member about an axis which is vertical when said member is in its correct stabilised position, a pin and slot connection between the free gyroscope and one arm of said pitch lever which arm extends generally fore and aft, and a pitch mass secured to the other arm of the pitch lever which other arm extends generally athwartships, means for erecting the free gyroscope in roll including a roll bell crank lever fulcrummed on the stabilised member about an axis which is vertical when said member is in its correct stabilised position, a pin and a slot connection between the free gyroscope and one arm of said roll lever which arm extends generally athwartships and a roll mass secured to the other arm of the roll lever which other arm extends generally fore and aft, a second gyroscope mounted on the stabilised member having a single gimbal ring and positioned with its spin and gimbal axes generally horizontal, and a lever connection from said gimbal ring to the roll bell crank lever to apply torque to the latter about its fulcrum.

11. Gyroscopic apparatus for defining the vertical in a moving craft, as claimed in claim 10, wherein the lever connection is adjustable to cooperate with the roll bell crank lever at different distances from the fulcrum of the latter.

JEFFERY WALTON BARNES.

REFERENCES CITED

The following references are of record in the file of this patent:

UNITED STATES PATENTS

| Number | Name | Date |
|---|---|---|
| 1,442,799 | Gray | Jan. 23, 1923 |
| 1,932,210 | Glitscher | Oct. 24, 1933 |
| 1,934,774 | Sperry et al. | Nov. 14, 1933 |
| 1,942,737 | Wood | Jan. 9, 1934 |
| 1,950,517 | Rawlings | Mar. 13, 1934 |
| 2,200,196 | Von Manteuffel | May 7, 1940 |
| 2,242,806 | Wunsch | May 20, 1941 |
| 2,380,941 | Carter | Aug. 7, 1945 |